April 8, 1969  H. NUSBAUM  3,437,771
LIQUID LEVEL SENSING MEANS
Filed May 9, 1967
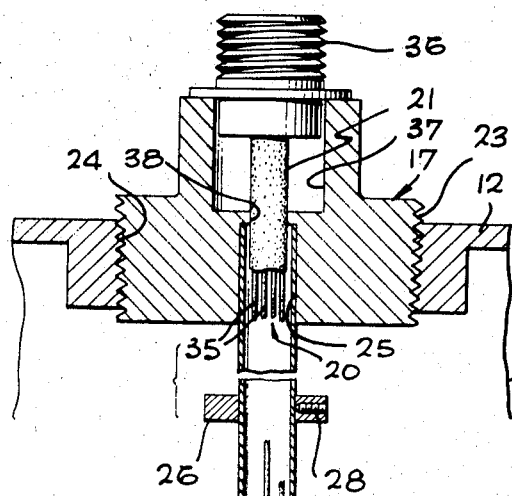
Fig. 1
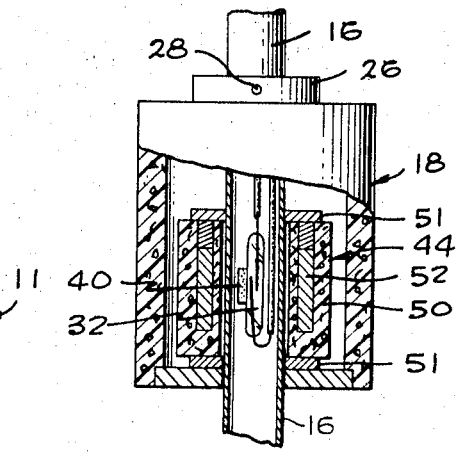
Fig. 2
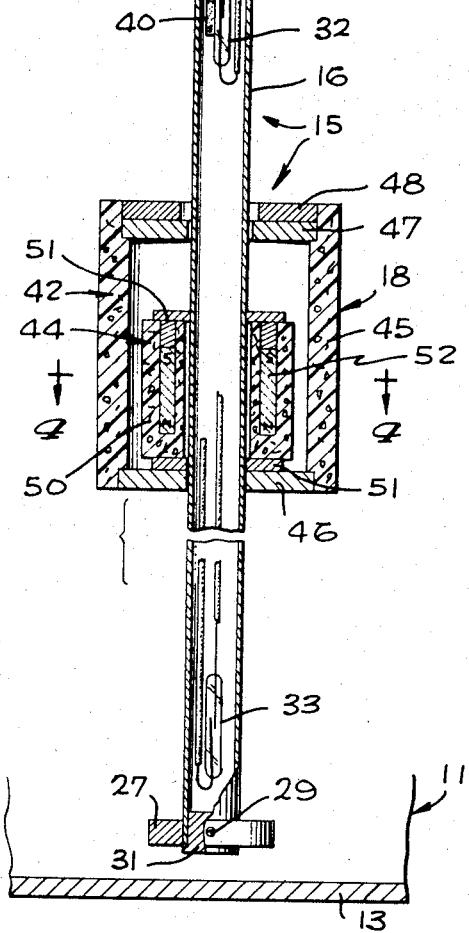
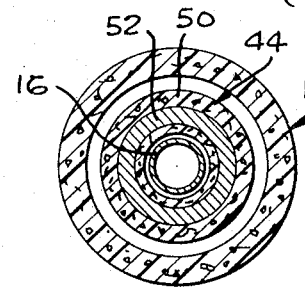
Fig. 3
Fig. 4
INVENTOR.
HENRY NUSBAUM
BY
Mason & Graham
ATTORNEY

United States Patent Office 3,437,771
Patented Apr. 8, 1969

3,437,771
LIQUID LEVEL SENSING MEANS
Henry Nusbaum, Los Angeles, Calif., assignor to Roylyn Incorporated, Glendale, Calif., a corporation of California
Filed May 9, 1967, Ser. No. 637,283
Int. Cl. H01h *35/18*
U.S. Cl. 200—84                                    10 Claims

ABSTRACT OF THE DISCLOSURE

The application discloses a liquid level or sensing means embodying a two-element float with one element confined by the other with limited relative movement therebetween mounted on a vertical guide tube and carrying magnetic means to operate a magnetically sensitive switch or the like along the path of the float.

---

This invention has to do generally with devices for sensing the level of liquid in a tank or the like and particularly with such means as employ magnetic sensing elements along the path of a float means which in turn carries magnetic means for operating the sensing elements.

An object of the invention is to provide a novel and improved liquid level sensing means embodying one or more magnetic sensing devices, such as magnetically operable switches, and a novel float means for operating these. In this connection it is a particular object to provide a novel float assembly constructed to include two relatively movable float elements, one of which is captive relative to the other and in which the captive one is provided with magnetic means for operating or affecting magnetic sensing devices or switches.

Another object is to provide a novel and improved liquid level sensing means embodying one or more reed switches or the like which eliminates the need for an electric circuit embodying a latching relay such as is required where the circuit must be held closed for an appreciable time period through a load such as a solenoid valve, electric motor, or the like, as in a conventional type circuit where a reed switch closable by a magnet is used.

Further in this connection it is an object to provide a novel and improved liquid level sensing means embodying a novel float assembly, including two relatively movable floats one of which carries a magnet and is held captive by the other, in conjunction with a guide tube or other means housing a magnetically operated reed switch or the like, together with magnetic means at the location of the switch for causing the captive float to be magnetically held against movement irrespective of the movement of the other float within the limits of relative movement permitted between the two floats.

These and other objects will be apparent from the drawing and the following description. Referring to the drawing:

FIG. 1 is a fragmentary sectional view of a tank or container and a central sectional elevational view of apparatus embodying the invention mounted thereon;

FIG. 2 is a fragmentary sectional view of the apparatus of FIG. 1 showing the float assembly opposite the upper switch;

FIG. 3 is a fragmentary sectional view of the float assembly showing the inner float member at the same position as it is shown in FIG. 2 but showing the outer float member moved downwardly somewhat from the position it is shown in FIG. 2; and FIG. 4 is a cross sectional view on line 4—4 of FIG. 1.

More particularly describing the invention, numeral 11 generally designates a tank or container adapted to store liquid which may be fuel or the like. The invention is intended for use in a tank where the liquid is withdrawn from time to time and replaced almost immediately upon its being withdrawn, although the invention is not so limited. Numeral 12 designates the upper wall of the container and numeral 13, the lower wall.

The apparatus of the invention is designated generally by numeral 15 and this includes a guide tube 16 mounted in a plug 17 and a float assembly 18 which is slideable along the guide tube. Within the latter is a switch assembly designated generally 20 and this is mounted within a tube 21.

The plug 17 is externally threaded at 23 to be mounted in a threaded opening 24 in the upper wall 12 of the tank. The guide tube 16, which may be brass or some other nonmagnetic material, is mounted in a counterbore 25 in the plug and carries a pair of spaced collars 26 and 27 which are held in place by setscrews 28 and 29, respectively, the collars serving to limit travel of the float assembly 18. The lower end of the tube 16 is closed by a cap 31.

For the purpose of illustration two reed switches, namely, an upper switch 32 and a lower switch 33, are shown as part of the switch assembly 20 and these are connected by suitable wiring 35 housed within the plastic tube 21 to terminals (not shown) in an electrical connector 36 mounted in a counterbore 37 in plug 17, the plastic tube and wires passing through a bore 38. For the purpose of illustration the lower switch 33 is shown as normally open. The upper switch is shown as normally closed due to the presence of a local bias magnet 40 provided thereon or associated with such switch for the purpose of closing it as well as for another purpose which will later become apparent. However, the particular location and disposition of the switches is not critical.

It is a particular feature of the invention that I provide a novel float assembly 18 which includes an outer float 42 and an inner float 44. The outer float comprises a cylindrical wall 45 of a suitable lightweight material and, for example, polyurethane foam plastic is suitable for the purpose. The lower end of the float is closed by an end plate 46 of any suitable lightweight material and a similar plate 47 is provided at the upper end as well as an auxiliary plate 48. The end plates are centrally bored to slideably accommodate the guide tube so that the outer float member can moved vertically along the tube with the rise and fall of the level of liquid in the tank.

The inner float 44 comprises a cylindrical foam plastic body 50 with end plates 51 slideably receiving the guide tube 16. A permanent magnet 52 is embedded in the body 50. The inner float is substantially shorter than the longitudinal interior dimension of the outer float whereby there is substantial possible relative movement between the two. Another feature of the float assembly is the fact that the inner float member is balanced so as to become a "negative gravity" type float, that is, the weight per unit volume of the float is somewhat higher than that of the liquid it will operate in.

In the operation of the structure in the event the liquid level should drop to the point where the float assembly would be opposite the lower switch 33, this switch would then be closed by the influence of the magnet 52 of the inner float 50. Switch 33 may be connected to close a circuit through a warning system of any suitable type.

Assuming, by way of example, that the float assembly is rising from the position of FIG. 1 as fluid is being pumped into or otherwise caused to enter the tank 11 by reason of upper switch 32 being closed (it being assumed that such switch is connected to close a circuit through means designed to cause liquid to enter the tank), when the float assembly reaches the position of FIG. 2, the magnet of the inner float overcomes the force of the magnet 40 associated with upper switch 32 thereby opening the switch. Subsequently when the liquid level drops and the outer float descends along the tube, such as is shown in FIG. 3, the attraction of the magnet 52 within the inner float for the magnet 40 of the switch 32 is such that the inner float in effect latches on or remains opposite the upper switch, as shown in FIG. 3, causing the upper switch to remain open until the inner float is finally carried down when the upper end of the outer float engages the upper end of the inner float.

Although I have illustrated and described a preferred form of my invention, I contemplate that various changes and modifications can be made therein without departing from the invention, the scope of which is indicated by the following claims.

I claim:

1. In a liquid level sensing means for use in a tank or the like adapted to hold a liquid which is partially withdrawn and replenished from time to time, an upright hollow guide member in the tank, a float assembly movable along the guide member, said float assembly including a main float and a traveling magnet mounted for limited vertical movement relative to the main float, a magnetically sensitive sensor housed in said guide member, a sensor bias magnet associated with said sensor normally holding said sensor in a predetermined condition, the relative strength and polarities of said traveling magnet and said bias magnet being such that, when said traveling magnet is opposite said bias magnet, it overcomes the force thereof to change the condition of said sensor and is sufficiently attracted thereby as to remain opposite said sensor irrespective of the movement of said main float within the limits of its permissive movement relative thereto.

2. Liquid level sensing means as set forth in claim 1 in which said magnet is carried by an inner float mounted for limited vertical movement within said main float.

3. The liquid level sensing means set forth in claim 2 in which said inner float has negative gravity.

4. The liquid level sensing means set forth in claim 1 in which said main float comprises a tubular member and in which said traveling magnet is carried by an inner float within said main float and having limited movement relative thereto, and in which the overall weight per unit volume of said inner float and magnet is somewhat higher than that of the liquid in which the float assembly is designed to operate.

5. In a liquid level sensing means for use in a tank or the like adapted to hold a liquid which is partially withdrawn and replenished from time to time, an upright hollow guide tube of nonmagnetic material in said tank, a float assembly including a tubular main float and a tubular inner float captive within the main float but movable vertically relative thereto, said floats receiving said guide tube and being slideable therealong, a first magnet carried by said inner float, the overall weight per unit volume of said inner float and said first magnet being somewhat higher than that of the liquid in the tank, a magnetically sensitive switch housed in said guide tube and adapted to be connected in an electrical circuit, and a switch bias magnet associated with said switch normally holding said switch in a predetermined condition, the relative strength and polarities of said first magnet and said switch bias magnet being such that, when said traveling magnet is opposite said switch bias magnet it overcomes the force thereof to change the condition of said switch and is sufficiently attracted thereby as to remain opposite said switch irrespective of the movement of said main float within the limits of its permissive movement relative thereto.

6. A float assembly, comprising a tubular outer float having end portions defining aligned guide tube-receiving apertures and having a space between said end portions, a tubular inner float within the space in said outer float and adapted to receive a vertical guide tube, said inner float being substantially shorter than said space in said outer float whereby said inner float is movable relative to said outer float, and a permanent magnet carried by said inner float, the overall weight per unit volume of said inner float and said magnet being somewhat higher than that of the liquid in which the float is designed to operate.

7. The float assembly set forth in claim 6 in which said outer and inner floats are cylindrical and, when assembled on a guide tube, are concentric about the tube.

8. A float assembly adapted to be mounted in a tank or the like, comprising a nonmagnetic guide tube adapted to be mounted in a vertical position in the tank, an outer float mounted on said guide tube for movement therealong, said outer float having a space therein, an inner float in said space and movable for a limited but substantial distance relative to the outer float axially of the guide tube, said tube being adapted to contain a sensing device, and means carried by said inner float for affecting the sensing device.

9. The float assembly set forth in claim 8 in which the overall weight per unit volume of said inner float and the sensing device affecting means is somewhat higher than that of the liquid in which the float assembly is designed to operate.

10. The float assembly set forth in claim 9 in which said sensing device affecting means is a permanent magnet.

References Cited

UNITED STATES PATENTS 2,915,605  12/1959  Friedell.
3,200,645  8/1965  Levins.

ROBERT K. SCHAEFER, *Primary Examiner.*

DAVID SMITH, *Assistant Examiner.*

U.S. Cl. X.R.

335—206